(12) United States Patent
Carter, Jr.

(10) Patent No.: US 6,527,515 B2
(45) Date of Patent: Mar. 4, 2003

(54) ROTOR FOR ROTARY WING AIRCRAFT

(75) Inventor: Jay W. Carter, Jr., Burkburnett, TX (US)

(73) Assignee: Cartercopter, L.L.C., Wichita Falls, TX (US)

( * ) Notice: Subject to any disclaimer, the term of this patent is extended or adjusted under 35 U.S.C. 154(b) by 0 days.

(21) Appl. No.: 09/863,655

(22) Filed: May 23, 2001

(65) Prior Publication Data

US 2001/0050322 A1 Dec. 13, 2001

Related U.S. Application Data

(60) Provisional application No. 60/206,661, filed on May 24, 2000.

(51) Int. Cl.[7] .............................................. B64C 11/00
(52) U.S. Cl. ..................... 416/134 A; 416/144; 416/500
(58) Field of Search .......................... 416/134 A, 500, 416/144, 139, 145, 229 R, 230, 241 A, 226

(56) References Cited

U.S. PATENT DOCUMENTS

| 4,281,966 A | 8/1981 | Duret et al. ............ 416/134 A |
| 5,462,409 A | * 10/1995 | Frengley et al. ............ 416/144 |
| 5,727,754 A | 3/1998 | Carter, Jr. |
| 5,853,145 A | 12/1998 | Carter, Jr. |
| 5,865,399 A | 2/1999 | Carter, Jr. |
| 5,944,283 A | 8/1999 | Carter, Jr. |
| 5,997,250 A | 12/1999 | Carter, Jr. et al. |
| 6,024,325 A | 2/2000 | Carter, Jr. |
| 6,077,041 A | 6/2000 | Carter, Jr. |
| 6,155,784 A | 12/2000 | Carter, Jr. |

* cited by examiner

Primary Examiner—Edward K. Look
Assistant Examiner—James M McAleenan
(74) Attorney, Agent, or Firm—Bracewell & Patterson, L.L.P.

(57) ABSTRACT

A rotor for rotary wing aircraft includes a number of features that reduce the collective forces required to control the pitch of the rotor. The spar caps of the spar become joined to one another at the same point where bonding begins between the blade and the spar. The tendency of blade to want to flatten out is minimized since the centrifugal force acting on the spar is located at or near the pitch change axis. Tip weights are located at or near the pitch change axis as well. In a preferred embodiment, the tip weights are located evenly in front of and behind the structural center of the inboard section of the spar. The blade of the rotor and the tip are not swept back.

16 Claims, 3 Drawing Sheets

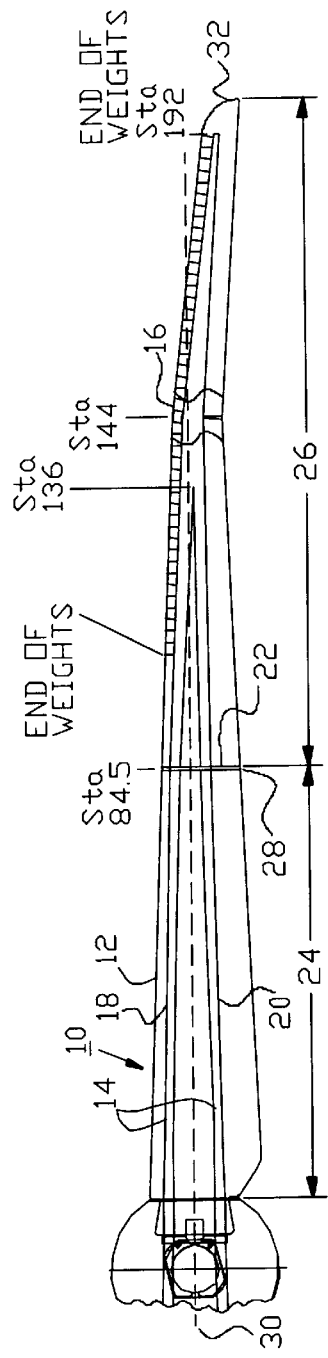

ROTOR FOR ROTARY WING AIRCRAFT

CROSS-REFERENCE TO RELATED APPLICATIONS

This application claims the priority of U.S. Provisional patent application serial no. 60/206,661 filed May 24, 2000.

BACKGROUND OF THE INVENTION

1. Field of the Invention

The present invention relates generally to rotors for rotary wing aircraft.

2. Description of the Related Art

One type of rotor used for rotary wing aircraft is a single structural blade assembly made up of outer blades and internal spar caps. The rotor has a tip at either extreme end. Each side of the blade of the rotor has a leading edge, that is moved into the wind during rotation of the rotor and a trailing edge that lies opposite the leading edge. Prior rotors, such as the one shown in U.S. Pat. No. 6,024,325 encase two flex-beam spars within the rotor. Manipulation of the location and orientation of the spars alters the pitch of the rotor, thus permitting control of the aircraft's lift.

Centrifugal force tends to move all rotating masses toward the plane of rotation because the plane of rotation represents the maximum distance that a mass can attain from the axis of rotation. When a symmetrical rotor blade is at zero pitch relative to the plane of rotation, every mass above the plane of rotation is matched by an equal mass on the lower side, so no pitch control forces are applied. However, when the rotor blade is pitched up, such as when the pilot pulls up on the collective, masses near the leading edge are moved above the plane of rotation and masses near the trailing edge are moved below the plane of rotation. Centrifugal force tends to urge both masses toward the plane of rotation, causing the blade to want to move toward zero pitch. Therefore, to minimize pitch control forces, all masses should be as close to the pitch change axis as possible.

U.S. Pat. No. 6,024,325 describes a rotor for rotary wing aircraft. That patent is incorporated herein by reference. The rotor described in the '325 patent provides a tremendous improvement over prior art rotors. However, some improvements are desirable.

A prototype constructed in accordance with the '325 patent flew well, but the collective forces were high. The large separation of the spar caps at the point of attachment to the blade increased collective control forces because centrifugal force urged the spar caps toward the plane of rotation. Also, the rotor blade of the rotor described in the '325 patent is swept back moving the outboard tip weights rearward to eliminate compressive stresses in the trailing edge, thus, moving the center of gravity of the tip weights toward the structural axis of the rotor. This sweep increases collective control forces because it increases the average distance of the tip weights away from the pitch change axis as centrifugal force tends to push the weights toward the plane of rotation. The sweep results in an aerodynamic "arrow" effect wherein the airstream on the swept tip tends to force the blade toward zero pitch.

The present invention provides improvements over the prior art.

SUMMARY OF THE INVENTION

An object of the invention is to provide an improved rotor having lower collective control forces while maintaining the advantages provided by prior art rotors. A number of features are used to achieve this. First, the spar caps of the spar become joined to one another at the same point where bonding begins between the blade and the spar. The tendency of blade to want to flatten out is minimized since centrifugal force acting on the spar caps tries to force the caps to stay in the plane of rotation and by placing the caps as close to the pitch axis as possible, reduces the moment arm and the moment resisting the spar from twisting. Tip weights are located at or near the pitch change axis as well. In a preferred embodiment, the tip weights are located evenly in front of and behind the structural center of the inboard section of the spar. The blade of the rotor and the tip are not swept back.

BRIEF DESCRIPTION OF THE DRAWINGS

FIG. 1 is a plan view of a portion of a prior art rotor. FIG. 1A (inset) is a detail view of tip weights 16.

FIG. 2 is a plan view of an exemplary rotor constructed in accordance with the present invention. FIG. 2A (inset) is a detail view of tip weights 80.

DETAILED DESCRIPTION OF THE PREFERRED EMBODIMENTS

Figure 3:
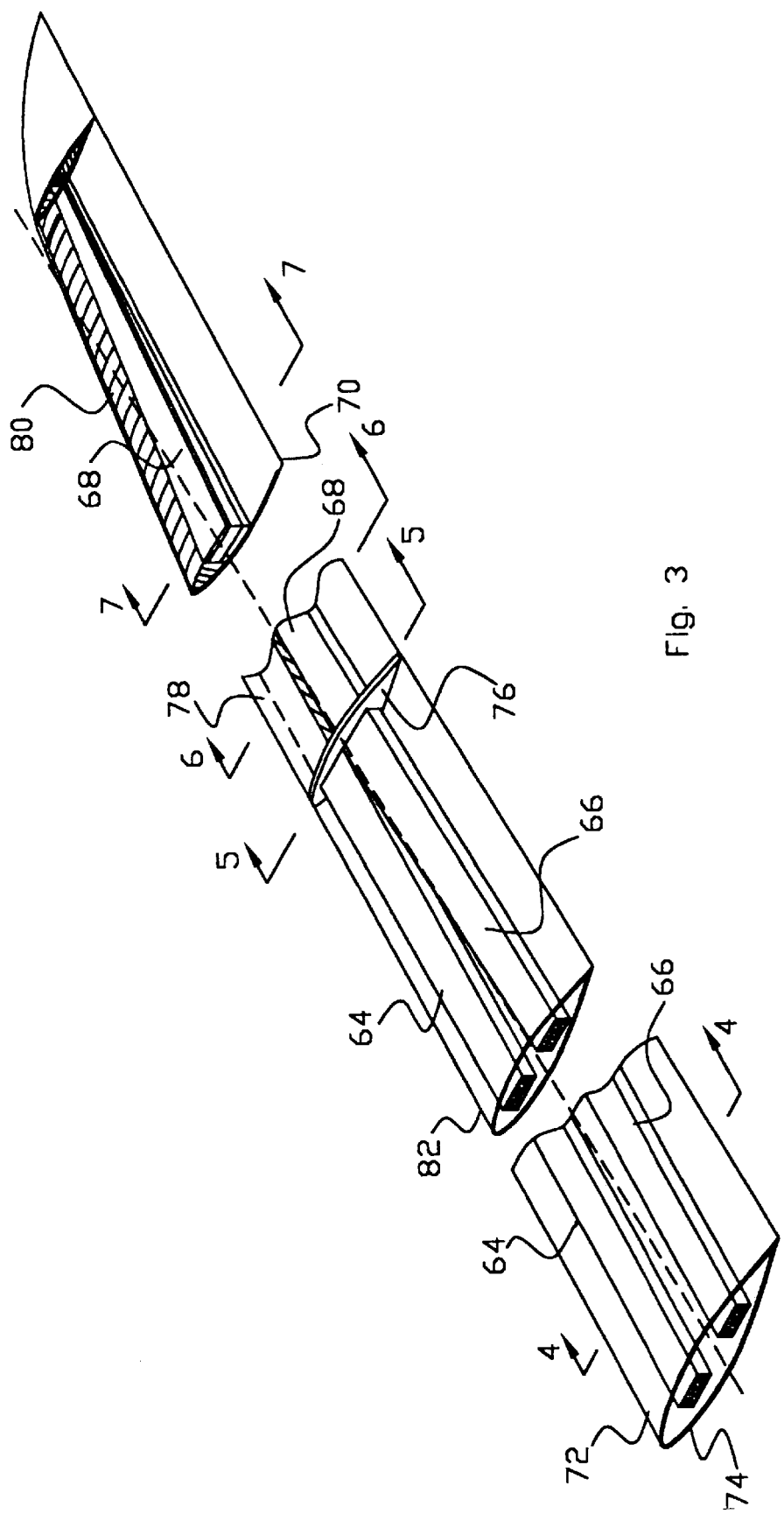
FIG. 3 is a partial cut-away isometric view of the rotor shown in FIG. 2.
Figure 4:
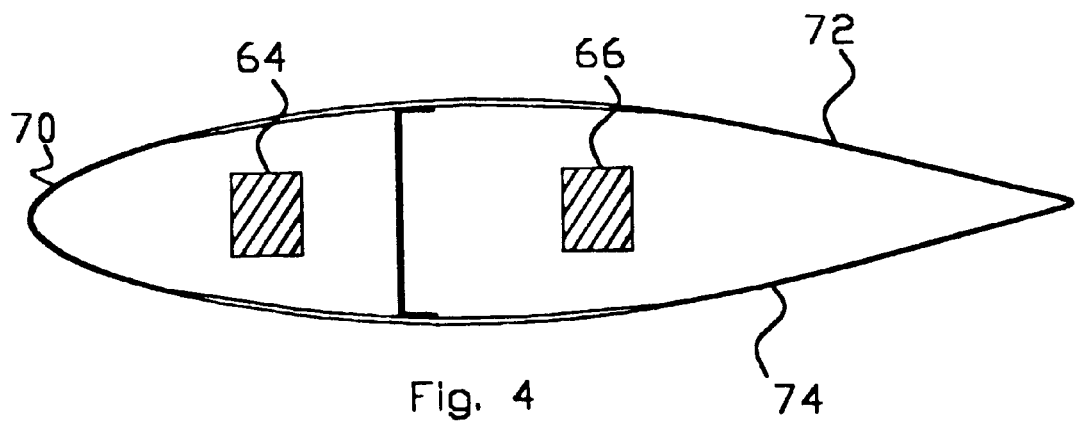
FIG. 4 is a cross-sectional view taken along lines 4—4 in FIG. 3.

Referring first to FIG. 1, half of prior art rotor 10 is shown of the type described in U.S. Pat. No. 6,024,325. The rotor 10 has an outer blade 12 with a spar 14 disposed therein. The blade 12 forms the aerodynamic housing of the rotor 10. Tip weights 16 are located along the forward edge of a portion of the rotor 10. The spar 14 comprises two spar caps 18, 20 that are separated from one another proximate the root of the rotor 10 and become joined to one another at approximately station 136. However, bending of the spar caps 18, 20 to the blade 12 occurs at station 84.5 and continues outboard of that point. Therefore, the bonding occurs inboard of the point where the spar caps 18, 20 become joined to one another. In addition, a structural rib 22 is disposed within the blades 12 at the point where bonding begins to further stiffen the rotor 10. The rotor 10 may be considered to have an inboard portion 24 that lies radially inward of the point where bonding begins. There is also an outboard portion 26. In the inboard portion, the spar caps 14 are readily moveable upwardly and downwardly within the blade 12 to one another in order to alter the pitch of the blade 12. In the outboard portion 26, the blade 12 is bonded to the spar caps 14. As a result, the spar caps 14 do not move with respect to one another within the housing of the blade 12 in the outboard portion 26. It should be appreciated that forces affecting pitch of the blade 12 are largely imparted to the blade 12 at the point 28 where the outboard section 24 and inboard section 26 meet. As can be seen, the spar caps 14 are widely separated from one another at point 28. Also, the tip of the blade 12 and spar are swept back.

The pitch change axis 30 for rotor 10 is shown on FIG. 1. The pitch change axis 30 is the axis around which the blade 12 will rotate when the pitch is changed by movement of the spars 14. As can be seen, the majority of the tip weights 16, particularly those proximate station 192, lie some distance behind the pitch change axis 30. Further, the nearer one gets to the blade tip 32, the further behind the axis 30 the weights 16 are located. During rotation of the rotor 10, centrifugal forces acting on the mass of the weights 16 will cause the weights 16 to want to move into the plane of rotation, thereby increasing the collective forces necessary to increase the pitch of the blade 10.

Turning now to FIGS. 2, 3, 4, 5, 6 and 7 there is shown an exemplary rotor 50 that is constructed in accordance with the present invention. The pitch change axis 52 for rotor 50 is shown in FIG. 2. The rotor 50 has two blade assemblies 54 and 56 that extend outwardly from spinner 58. Because construction of the two blade assemblies 54, 56 is identical, only the construction of blade assembly 54 will be described in detail. Stations along the blade assembly 54 are indicated by numerals in FIG. 2. As discussed herein, stations refer to that position measured in inches from the axis of rotation 60 for the rotor 50. Dimensions given are for illustrative purposes only. The rotor 50 has a unitary spar 62 that extends nearly tip-to-tip. The spar 62 is separated along its central section into two spar caps 64, 66. The spar caps 64, 66 merge with one another to form a single outboard spar portion 68. A blade cuff 69 is used to transfer pitch control forces to the blade assembly 54 to twist the spar caps 64, 66. The blade assembly 54 has an outer blade housing 70 that is made up of an upper skin 72 and a lower skin 74 that, collectively, form the airfoil surface for the rotor 50. The blade housing, 70 is not swept back, but the very outboard section is swept back like a shark fin to reduce noise. The spar portion 68 is swept back a few degrees within the housing 70 proximate the tip 51.

Figure 5:
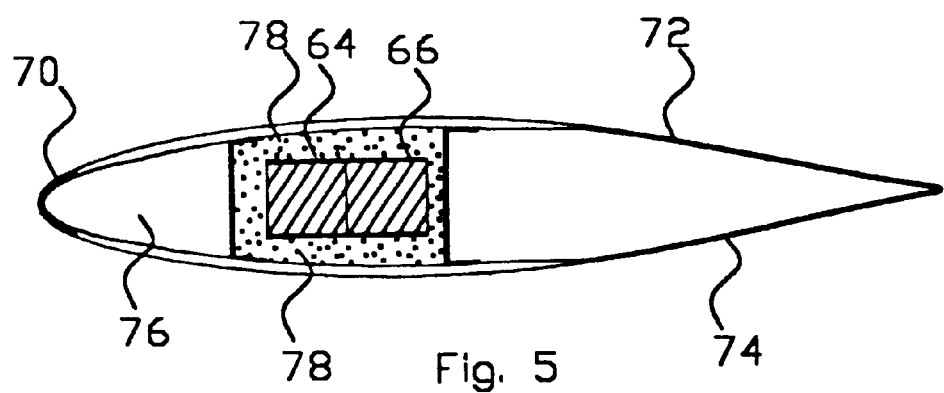
FIG. 5 is a cross-sectional view taken along lines 5—5 in FIG. 3.
Figure 6:
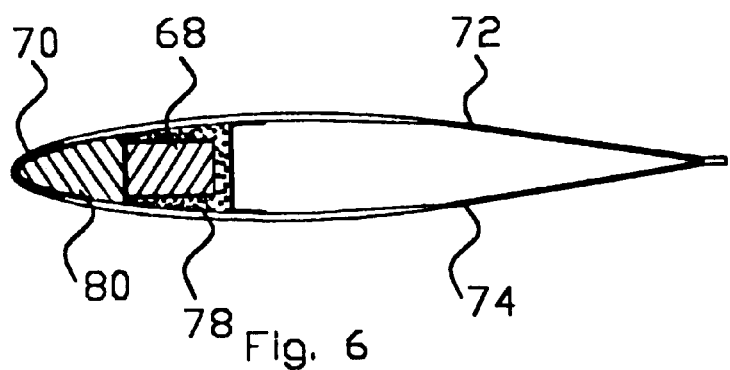
FIG. 6 is a cross-sectional view taken along lines 6—6 in FIG. 3.
Figure 7:
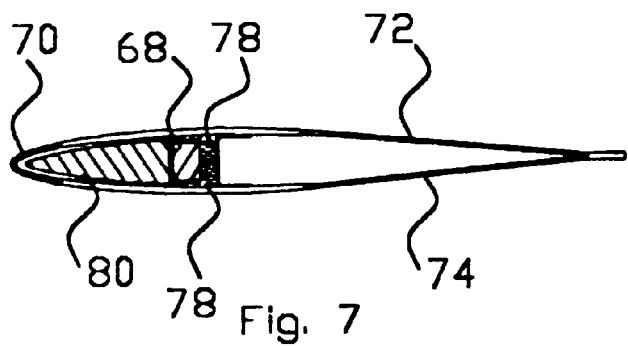
FIG. 7 is a cross-sectional view taken along lines 7—7 in FIG. 3.

Separation of the spar caps 64, 66 from one another is gradually reduced from the root, or axis of rotation 60 toward the station 114 of the rotor blade assembly 54. The spar caps 64, 66 become joined to one another at approximately station 114. A reinforcing rib 76 is located at that station as well. Inboard of the rib 76, along inboard portion 77, the spar caps 64, 66 are not bonded to the blade housing 70 so that they may be moved upwardly and downwardly within the housing 70. Outboard of the rib 76, along outboard portion 79, the spar portion 68 is bonded to the blade housing 70 using bonding material 78. As best shown in FIGS. 5, 6 and 7, bonding material 78 fills the space between the spar portion 68 and the outer blade housing 70.

Tip weights 80 are disposed along the leading edge 82 of the blade assembly 54. In the described embodiment, the tip weights 80 extend from station 184 outwardly to station 252. As can 5 be seen with reference to FIG. 2, the location of the tip weights 80 approximates the pitch change axis 52. In other words, the weights 80 are located to minimize the average distance between the weights 80 and the pitch change axis 52. The rearward sweep of the spar portion 68 proximate the tip 51 allows for this placement. The rotor tip weights 80 are positioned near the leading edge 82 to keep the center of mass ahead of the blade aerodynamic center. In a preferred embodiment, the tip weights 80 are located evenly in front of and behind the structural center of the inboard section of the spar 62.

In operation, the exemplary rotor 50 uses three primary features to reduce collective control forces. First, separation of the spar caps 64, 66 gradually reduced from the root 60 toward the tip 51 until the spar caps 64, 66 marry one another at the point where the blade housing 70 is attached to the spar 62. Second, rotor tip weights 80 are attached to minimize the average distance between the weights 80 and the pitch change axis 52 of the blade assembly 54. Third, the spar 62 is swept back proximate the tip 51 to follow the trailing edge of the tip weights 80. The aerodynamic shell of the blade housing 70 is not swept.

While the invention has been described with reference to a preferred embodiment, it should be apparent to those skilled in the art that it is not so limited, but is susceptible to various modifications and changes Without departing from the scope of the invention.

What is claimed is:

1. A rotor for rotary wing aircraft having a pair of blade assemblies that extend outwardly from a rotor axis of rotation, each blade assembly comprising:
   an inboard portion located outboard of the rotor axis of rotation, the inboard portion having an outer blade housing and a pair of separate spar caps each of the spar caps having a length and extending through the inboard portion along their entire length, the spar caps not being bonded to the blade housing along the entire length of the spar caps;
   an outboard portion located outboard of the inboard portion, the outboard portion having an outer blade housing and a single merged spar portion extending therethrough, the single spar portion being bonded to the blade housing along substantially all of the length of the single spar portion; and
   a plurality of tip weights within the outboard portion of the blade housing.

2. The rotor of claim 1 further comprising a reinforcing rib within the blade housing between the inboard and outboard portions.

3. The rotor of claim 2 wherein the spar caps merge with one another at approximately the same station where the reinforcing rib is located.

4. The rotor of claim 3 wherein the spar caps merge with each other at approximately station 114.

5. The rotor of claim 1 wherein the outer blade housing is not swept back proximate its outboard tip.

6. The rotor of claim 1 wherein said plurality of tip weights are located to substantially approximate a pitch change axis for the blade assembly.

7. The rotor of claim 6 wherein the tip weights are located substantially evenly in front of and behind the single spar portion.

8. A rotor for rotary wing aircraft having a pair of blade assemblies that extend outwardly from a rotor axis of rotation, each blade assembly comprising:
   a longitudinal spar extending from the rotor axis of rotation, the spar comprising a pair of separate spar caps and a single spar portion formed by the merged spar caps;
   a blade housing en closing the longitudinal spar, the blade housing providing an aerodynamic airfoil for the blade assembly;
   an outboard portion of the blade assembly wherein the single spar portion is bonded to the blade housing along its entire length;
   the separate spar caps not being bonded to the blade housing along their entire lengths; and
   a tip weight disposed along a forward edge of the outboard portion.

9. The rotor of claim 8 further comprising a reinforcing rib located within the blade housing and dividing the inboard portion from the outboard portion.

10. The rotor of claim 8 wherein the housing of the blade assembly is not swept rearwardly.

11. The rotor of claim 8 wherein the pair of separate spar caps merge with one another to form the single spar portion, said merging occurring at the location at which bonding of the single spar portion to the blade housing begins.

12. The rotor of claim 8 wherein the rotor blade assembly has a pitch change axis, and said tip weight is located substantially upon the pitch change axis.

13. A rotor for rotary wing aircraft that provides a pair of blade assemblies that extend outwardly from a rotor axis of rotation, the rotor comprising:

a longitudinal spar having a central portion that is secured to a hub, the central portion of the spar comprising a pair of separated spar caps that can be moved to control the pitch of the blade assemblies;

the spar further comprising distal single spar portions;

a blade housing that encloses the spar to form an airfoil, the blade housing having a plurality of tip weights retained within; and the blade housing being bonded to the single spar portions but not to the separate spar caps.

14. The rotor of claim 13 wherein the blade assembly has a pitch change axis and the tip weights are disposed proximate the pitch change axis.

15. The rotor of claim 13 wherein the distal single spar portions each have a rearwardly swept portion.

16. The rotor of claim 13 wherein no portion of the blade housing is swept rearwardly.

* * * * *